United States Patent [19]
Gerulis

[11] Patent Number: 4,645,591
[45] Date of Patent: Feb. 24, 1987

[54] SELF-CLEANING FLUID FILTER

[76] Inventor: Benedict R. Gerulis, 1229 104th Way, Blaine, Minn. 55434

[21] Appl. No.: 835,538

[22] Filed: Mar. 3, 1986

[51] Int. Cl.⁴ ............................................. B01D 27/12
[52] U.S. Cl. .................................... 210/108; 210/411; 210/DIG. 17
[58] Field of Search ............ 210/108, 130, 411, 416.5, 210/DIG. 17

[56] References Cited
U.S. PATENT DOCUMENTS

| | | | |
|---|---|---|---|
| 3,044,475 | 7/1962 | Thompson | 210/DIG. 17 |
| 4,090,962 | 5/1978 | Braukmann | 210/108 |
| 4,268,384 | 5/1981 | Rosaen | 210/DIG. 17 |
| 4,549,961 | 10/1985 | Bellemann | 210/108 |
| 4,581,135 | 4/1986 | Gerulis | 210/108 |

*Primary Examiner*—John Adee
*Attorney, Agent, or Firm*—Lawrence M. Nawrocki

[57] ABSTRACT

A self-cleaning canister type filter (1). A cylindrical canister enclosure (3) has, at one end, end plate (2) with fluid inlets (4) and outlet (6) therein. A spring-loaded hollow annular piston (30) is slideably mounted on the exterior of central tubular cylinder (10) and within upper cylinder (28) for a downward movement against compression spring (32) to initially force a back-flow of filtered fluid through filter element (14), lifting contaminant particulate solids from its filtering surface (15). Inlet valve opening (64) is opened to fluid flow when piston (30) attains a compressed position. Filter element (14) is closely spaced to canister enclosure inner wall surface (9) for rapid flow of fluid over the inlet surface (15) of the filter element (14) to scour solids to sump (5) in the lower portion of the canister enclosure (3). A lower spring-loaded piston (18) communicates with sump (5) and is forced upward by entering contaminated fluid until an attached sleeve valve piston (23) slideably mounted in tubular cylinder (10) opens to permit filtered fluid to exit the filter (1), resulting in normal filtration flow of fluid through filter element (14).

20 Claims, 5 Drawing Figures

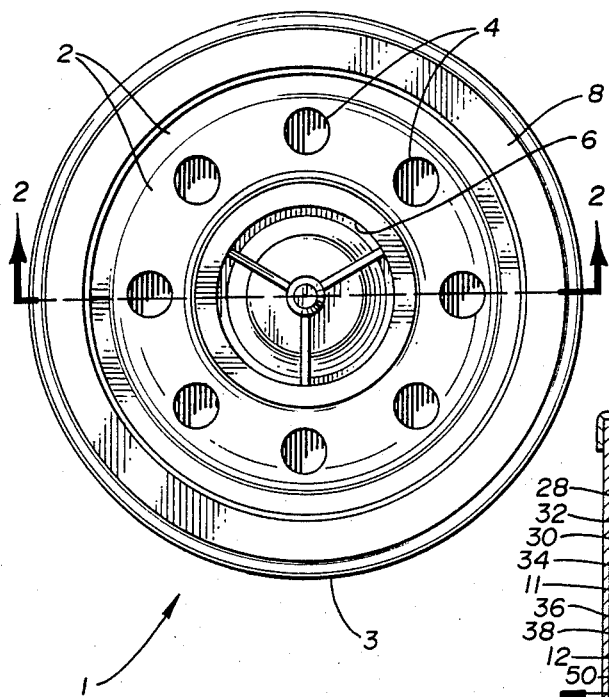
Fig. 1
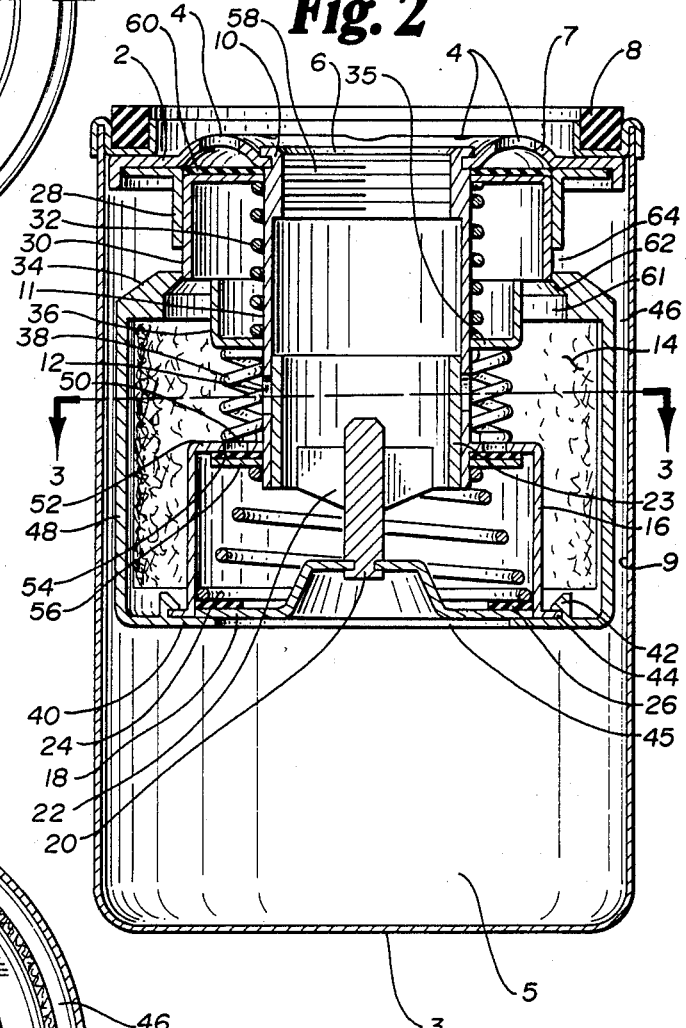
Fig. 2
Fig. 3

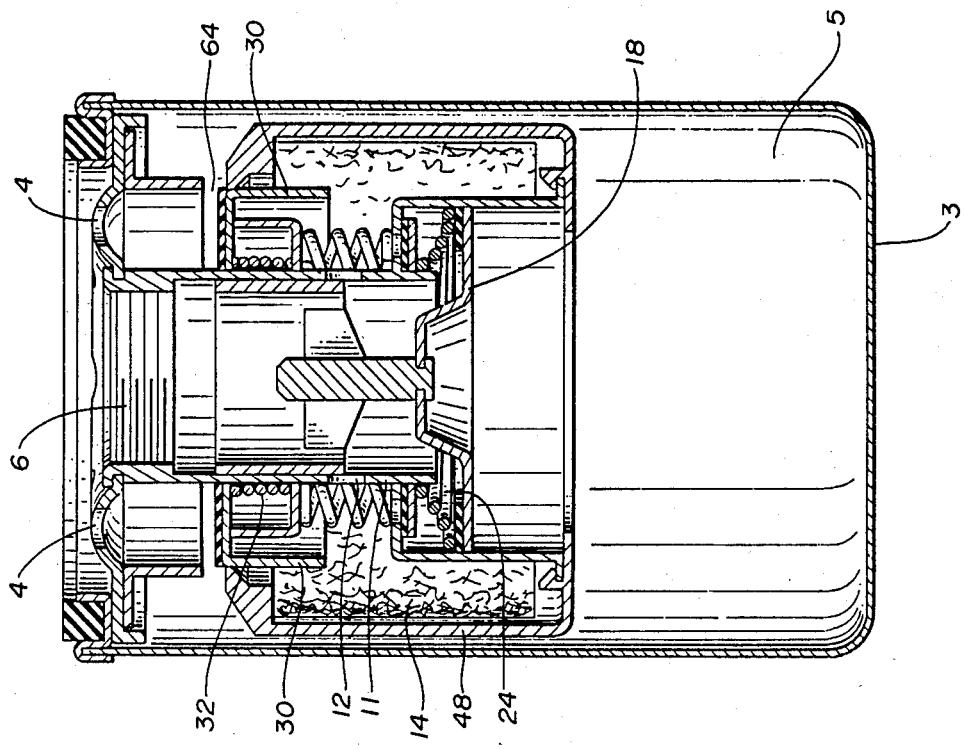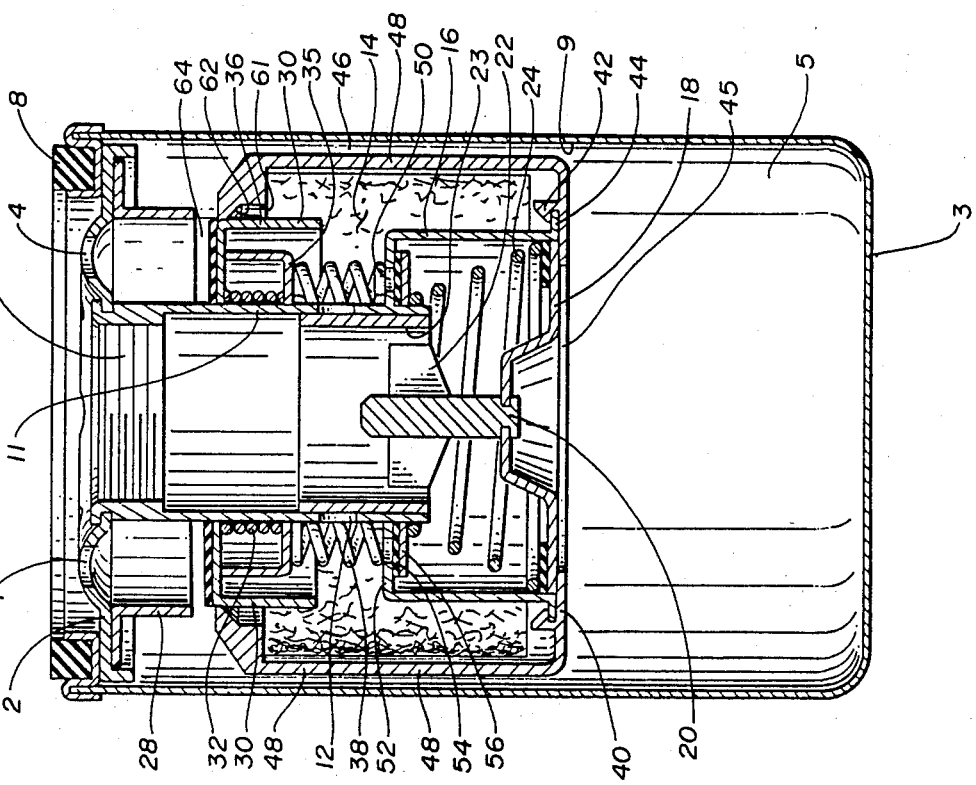

SELF-CLEANING FLUID FILTER

TECHNICAL FIELD

The invention of the present application relates broadly to fluid filters. More specifically, it relates to canister-type filters commonly used on internal combustion engines and similar machinery to remove particulate matters from the lubricating oil. The structure provides for automatic self-cleaning of the filter element upon start-up, greatly extending the useful operating life of the filter.

BACKGROUND OF THE INVENTION

Canister type filters are commonly used for removing particulate matter from lubricating oils, and are attached to the lubricated machine to continuously filter the oil while the machine is operating. Widely used on motor vehicle engines, such filters are typically discarded after only 100-300 hours of use because of clogging. Canister type disposable filters are also used on other industrial equipment including gas compressors and hydraulic systems for cleaning lubricants and hydraulic fluids.

Another use of canister-type filters is the removal of particulate matter from water. For example, such filters may be found in homes and industry for removing sand, grit, rust and purification chemicals from municipal water supplies.

The useful life of such filters is limited by the rate at which the pressure drop across the filter element increases due to clogging by particulate matter. All of the particulate matter removed by the filter element remains on or in the element, which provides little storage capacity for such contaminants. A short filter life results.

Common disposable canister filters have a closed cylindrically shaped canister with the inlet and outlet at the upper end, or face. The filter outlet is an internally threaded coupling centrally located in the face, and is screwed onto a threaded nipple in a matching face on the filter receptacle on the engine or other fluid using apparatus. Filter inlet holes encircle the filter outlet and accept contaminated fluid from corresponding ports in the filter receptacle which lead from the engine. A narrow elastomeric seal on the filter face encircles the inlet holes. When the filter outlet is screwed onto the corresponding nipple, the seal is compressed between the matching faces to prevent leakage of fluid.

The filter element is generally annular, with fluid flowing from the exterior surface toward the central axis. Various filter media materials can appropriately be used, and may be adapted depending upon the type of filtration practiced.

SUMMARY OF THE INVENTION

The present invention is a self-cleaning canister-type filter for removing particulate solids and other filterable matter from fluids. Although its primary use is anticipated to be the purification of motor oils circulated through internal combustion engines, gas compressors and the like, its utility also extends to the filtration of water, aqueous fluids and organic materials, whether gasseous or liquid.

The filter element and attendant apparatus are enclosed in a canister enclosure having a fluid inlet and outlet. A sump is provided in the lower portion of the canister enclosure for retaining contaminants scoured from the surface of the filter element. The self-cleaning action occurs each time the filter is brought up to operating pressure by entrance of the pressurized contaminated fluid. An upper spring-loaded piston is compressed downward by the entering fluid to force residual filtered fluid in a reverse direction through the filter element, dislodging contaminants from the surface. The upper piston is then driven further downward past an opening leading to the filtering surface of the filter element and the sump below. The incoming contaminated fluid flows past the filtration surface and, in combination with the reverse flow of filtered fluid, carries dislodged contaminants to the sump. A lower spring-loaded piston is compressed upward by the fluid entering the sump until an attached sleeve valve attains an open position, allowing normal flow of filtered fluid to the filter outlet.

The initial period during which particulate contaminants are scoured from the filtering surface is generally of short duration. The duration is determined by the flow rate of fluid past the filtration surface and the displacement of the lower piston from its uncompressed position to its position at which the sleeve valve is open.

Although short in duration, the self-cleaning action results in scouring of particulate solids from the filtration surface for deposit in the sump. The filter life is greatly extended, eliminating frequent shut-down of equipment to change the filters. Motor vehicles and other machinery can be operated for a much longer period between oil filter replacement.

A further feature of the present invention is apparatus for relieving possible over pressure in two independent stages. In the first stage, excessive inlet fluid pressure drives the upper piston downward against spring means to a compressed position where the inlet fluid flows past the upper piston directly into a filtered fluid chamber and through the open sleeve valve to the filter outlet. If for some reason the sleeve valve is not open, a second relief valve will open due to excessive pressure downstream of the filter element. This second relief valve comprises an elastomeric member with a spring-loaded backing, compressed against one or more relief holes in the lower piston cylinder. Excessive fluid pressure forces the elastomeric member away from the cylinder to permit fluid to flow to the filter outlet.

Thus, this invention provides long-term filtration not achieved by prior art canister filters, and provides for continued fluid flow even when the fluid pressure becomes excessive. The filtration surface is automatically cleaned upon start-up, requiring no personal attention or control.

BRIEF DESCRIPTION OF THE DRAWINGS

FIG. 1 is a top plan view of a self-cleaning filter of the present invention;

FIG. 2 is a sectional side elevational view taken along line 2—2 of FIG. 1;

FIG. 3 is a top plan sectional view taken along line 3—3 of FIG. 2;

FIG. 4 is a sectional side elevational view similar to that of FIG. 2 with some elements shown in a secondary, compressed position; and FIG. 5 is a view similar to that of FIG. 4 with elements shown in a tertiary compressed position.

DETAILED DESCRIPTION OF THE INVENTION

Referring now to the drawings, FIG. 1 shows a top view of an embodiment of the present invention. End plate 2 extends across the upper end of the filter. An outlet 6 is centrally located for fluid flow from the filter. A plurality of inlet holes 4 is radially spaced from outlet 6 for admitting contaminated fluid which is to be filtered. An elastomeric ring seal 8 forms a circular seal around inlet holes 4 for sealing the filter to a filter receptacle on an internal combustion engine for example.

As shown in the sectional side view of FIG. 2, canister enclosure 3 is a thin-walled vessel preferably of cylindrical shape having its upper end sealingly attached at its periphery to end plate 2. Central tubular cylinder 10, whose upper end comprises outlet 6, is attached by internal screw threads 58 to a filter receptacle. The construction of the inlet holes 4 and outlet 6, matches filter receptacles in current use, so that filter 1 will fit existing equipment without modification of the receptacle.

Central tubular cylinder 10 is fixedly attached to end plate 2 and extends downwardly into canister enclosure 3 to form a sleeve valve cylinder 11 in its lower portion. Ports 12 in sleeve valve cylinder 11 provide the normal path of filtered fluid to outlet 6 from filter element 14. Sleeve valve piston 23 is an open tubular member slideably mounted in sleeve valve cylinder 11, and is fixedly connected to a lower piston 18 slideably mounted in lower cylinder 16. Cylinder 16 is fixedly attached its upper end to sleeve valve cylinder 11. Lower piston 18 is spring-mounted in lower cylinder 16 so that it is motivated upward by fluid pressure against lower compression spring 24.

In the embodiment shown in the figures, lower piston 18 and sleeve valve piston 23 are joined by upright post 20 having multiple wings 22 which extend radially to sleeve valve piston 23, to which they are joined. However, any joining means may be used which rigidly joins the two pistons and does not restrict flow through the sleeve valve piston. In its preferred embodiment, lower compression spring 24 is a conical helical spring having a greater overall diameter at its lower end.

Sump 5 comprises space in the lower portion of canister enclosure 3. Preferably, the sump volume is 10-50 percent of the total volume of the canister enclosure, for receiving and storing particulate solids scoured from the filter element 14. The volume of sump 5 must be sufficiently large so that particulate solids settled to the bottom thereof are not greatly disturbed by fluid entering during startup or fluid leaving at shutdown. The fluid flow rate to or from sump 5 during those periods depends upon fluid viscosity, the pressure of incoming fluid, and the clearance space 46 for fluid flow between filter element 14 and the inner wall surface 9 of canister enclosure 3.

Inner enclosure 40 is attached to lower cylinder 16, for example by hook retainers 42 which grip rim 44 on the lower cylinder. A port 45 in inner enclosure 40 permits flow of contaminated fluid to exert pressure upon piston 18 for moving it upward against compression spring 24 to open sleeve valve ports 12. A plurality of struts 48 extend upwardly from the periphery of inner enclosure 40 to sealingly support filter element 14, and are joined to upper piston guide member 34, described hereinafter. The inner enclosure, struts and upper piston guide member serve to restrict flow of fluid so that, under normal filtering conditions, all incoming fluid to filter 1 must pass through filter element 14 in order to be discharged.

Filter element 14 may be fabricated from a wide variety of materials. Materials which retain the filtered solids in a thin layer at the filtration surface 15 of the element is preferred. The element 14 must have sufficient structural strength to withstand the pressure drop across it. The embodiment shown in FIG. 3 is a thin filter element 14 comprised of four separate filter segments sealingly bonded to inner enclosure 40, the four struts 48 and upper piston guide member 34.

Alternative constructions are possible. For example, filter element 14 may be a single unit or filter media supported on its inner surface by struts 48. Any number of struts may be used.

Looking again at FIG. 2, upper cylinder 28 is shown ataached to end plate 2 and extending downward coaxially with central tubular cylinder 10. Preferably, an annular raised portion 7 of end plate 2 contains inlet holes 4, and provides added rigidity to end plate 2. Upper cylinder 28 communicates with inlet holes 4 for passage of contaminated fluid into the filter. Upper piston 30 is annular in shape as viewed from above and is slideaby mounted in the annular space between central tubular cylinder 10 and upper cylinder 28. In a preferred embodiment, piston 30 also sealingly communicates with upper piston guide member 34, through which it passes, to retain contaminated fluid on the inlet side of filter element 14 and prevent contaminated fluid from bypassing the filter element.

Upper piston 30 is spring-loaded by upper compression spring 32. Contaminated fluid passing through inlet holes 4 under pressure motivates upper piston 30 downward against upper compression spring 32. When downward travel of piston 30 reaches inlet valve opening 64 between upper cylinder 28 and piston guide member 34, contaminated fluid passes to the inlet surface 15 of filter element 14 and past surface 15 through clearance space 46 to sump 5. Thus, upper cylinder 28 and upper piston 30 act as a valve for admitting contaminated fluid at a pressure determined by the characteristics of upper compression spring 32. Downward travel of piston 30 also results in compression of fluid within a chamber defined by filter element 14 and back-flushing of the filter element to lift contaminant solids from filtration surface 15 for removal to sump 5.

A preferred embodiment of the present invention incorporates relief valve structure in upper piston guide member 34 to allow contaminated fluid to bypass filter element 14 when its pressure is excessive. This may occur for example when the fluid is below working temperature, resulting in high viscosity, or when filter element 14 becomes clogged with contaminant materials.

Piston guide member opening 61 is normally in sealing contact at its upper end with upper piston 30, whether pressurized or unpressurized. Enlargement 62 in opening 61 in piston guide member 34 provides for relieved flow of inlet fluid between piston 30 and guide member 34 when excessive fluid pressure forces piston 30 downward through guide member 34 to enlargement 62. Relieved fluid passes directly to the downstream side of filter element 14 and through sleeve valve ports 12 to filter outlet 6.

In the preferred embodiment, upper compression spring 32 rests on spring retainer 35 which in turn is supported by central compression spring means 38.

Spring retainer 35 is an annular member which is slideably mounted on sleeve valve cylinder 11. While it may have a flat washer configuration, it preferably is cup shaped as shown in FIG. 2, having a vertical side 36 which acts as a stop to upper piston 30 when that piston in a compressed position allowing fluid flow from inlet holes 4 through inlet valve opening 64 to the filter element 14. Cup shaped retainer 35 also serves to protect upper compression spring 32 from overcompression damage.

Preferably, upper piston 30 is largely hollow, having an inverted cup shape to provide vertical space for spring 32. A spring is required of sufficient vertical length to enable an adequate backflow volume of fluid through filter element 14 to lift solids from its surface 15. Upper piston 30 and spring retainer 35 provide the necessary space.

Further downward movement of piston 30 to relieve excessively high fluid pressures requires downward compression of central compression spring means 38.

Upper compression spring 32 serves to return upper piston 30 to its uppermost or fully closed position when the flow of fluid to the filter is interrupted, in order to facilitate backflow of filtered fluid through the filter element upon subsequent startup. Therefore, the design compressive load on spring 32 to open the filter to normal fluid flow is small in comparison to the design load on central compression spring means 38. The force: displacement ratio of spring means 38 is greater than either the upper compression spring 32 or lower compression spring 24. While spring means 38 may comprise a single helical compression spring through which sleeve valve cylinder 11 passes, the preferred construction uses three or more vertically oriented helical springs equally spaced in a circle surrounding cylinder 11. The spring or springs comprising spring means 38 rest on top closure 52 of lower cylinder 16 which is fixedly attached to cylinder 11.

Lower compression spring 24 is also fully compressed at a pressure lower than that required to compress central compression spring means 38 to relieve excess pressure. The volume of fluid which scours the filter surface 15 depends only upon the displacement of lower piston 18 as it moves upward to open sleeve valve ports 12. The volume is independent of spring characteristics. However, a spring 24 which opens at a lower pressure provides a high pressure drop from inlet valve opening 64 to sump 5, resulting in a higher fluid velocity past filter surface 15. Thus, a spring 24 requiring greater compressive force results in lower fluid velocity past surface 15, lengthening the duration of scouring, but scouring at a lower fluid velocity. Best cleaning of the filter element generally occurs at the highest fluid velocity, so spring 24 preferably has a relative low module of elasticity and/or low cross-section.

In order to facilitate efficient cleaning of the filtration surface 15, the volume of scouring fluid and backwash fluid should exceed the clearance space 46 between canister inner wall surface 9 and filtration surface 15, to transport contaminant materials from the filtration surface to sump 5.

Because of the necessary fluid flow in clearance space 46 between filter element 14 and inner wall surface 9 of canister enclosure 3, it is understood that such space must be maintained. Any appropriate means to accomplish that end may be used.

An additional feature of the present invention is a secondary relief valve construction which permits fluid flow to bypass sleeve valve ports 12 if for any reason an excessive pressure exists downstream of filter element 14 and sleeve valve piston 23 remains in the lower, closed position. Lower relief holes 50 in the top closure 52 of lower cylinder 16 are normally closed from beneath by elastomeric relief seal membrane 54 having a rigid backing member 56 pressed upwardly by lower compression spring 24. Excess pressure above top closure 52 forces membrane 54 and backing member 56 downward to allow fluid flow through relief holes 50.

As shown in FIG. 2, upper piston 30 has attached to it an upper piston seal 60 for preventing fluid leakage between piston 30 and central tubular cylinder 10 or upper cylinder 28. Likewise, lower piston 18 includes lower piston seal 26 held in place against the upper side of the piston by spring 24.

FIG. 3 is a top plan sectional view taken along line 3—3 of FIG. 2. Within cylindrically shaped canister enclosure 3 is filter element 14 having an inlet filtration surface 15 narrowly spaced from the inner canister wall surface 9 by clearance space 46. Inner enclosure 40 and four upright struts 48 are sealingly bonded to filter element 14, and enclosure 40 is fixedly attached by hook retainer 42 to lower cylinder rim 44 which is part of lower cylinder 16. In this embodiment, central compression spring means 38 comprises three upright compression springs equally spaced around sleeve valve cylinder 11. Springs 38 rest on the top closure 52 of lower cylinder 16. Top closure 52 also includes a plurality of lower relief holes 50 in array around sleeve valve cylinder 11.

FIG. 3 also shows post 20 attached to lower piston 18, and having a plurality of wings 22 fixedly connecting post 20 to sleeve valve piston 23.

FIGS. 4 and 5 illustrate the movements of pistons 30 and 18 to accomplish cleaning of filter element 14 in this invention. As shown in FIG. 4, pressurized contaminated fluid initially enters inlet holes and forces upper piston 30 downward against upper compression spring 32 until piston 30 is below inlet valve opening 64. As piston 30 is depressed, it forces filtered fluid downstream of filter element 14 to backflow through filter element 14 to lift contaminants therefrom. This backflow of fluid passes through filter element 14 and downward into sump 5, slightly raising lower piston 18. Sleeve valve ports 12 remain closed.

When upper piston 30 is forced downward sufficiently to open inlet valve openings 64 to flow, pressurized fluid rapidly passes through clearance space 46 to scour contaminants from the filtration surface and deposit them in sump 5. As fluid continues to enter the sump, lower piston 18 continues to move upward.

As shown in FIG. 5, scouring continues until lower piston 18 is forced upward to a level where sleeve valve ports 12 are open to flow (that is, sleeve valve piston 23 is lifted beyond the ports 12). At this point, normal filtration flow begins. Incoming contaminated fluid passes through filter element 14 to remove contaminants, and passes through ports 12 to the filter outlet. The compressive forces of the fluid acting on pistons 30 and 18 are counter-balanced by springs 32 and 24, respectively, to maintain inlet valve opening 64 and sleeve valve ports 12 open to fluid flow.

The cleaning cycle is produced each time the filter is started from a non-pressurized condition. Cleaning can be initiated by momentarily closing a valve on the contaminated fluid line leading to the filter. However, in most applications the fluid using machine is shut down often enough to provide the requisite frequency of cleaning. Storage of contaminating particulate matter in sump 5 results in a greatly enhanced useful life, when compared to prior art filters in current use.

The filter of this invention is adaptable to a variety of applications having different fluid flow rate types of contaminants, and fluid pressures. The particular filtration media which is used, and the filtration surface area may be varied to meet specific conditions. By using springs of different modules of elasticity and/or thicknesses, the operating pressure range may be modified for a wide range of applications.

The outer configuration of the filter is conformable to existing filter receptacles, enabling its direct substitution for prior art disposable filters without any modification of the receptacle.

Numerous characteristics and advantages of this invention have been set forth in the foregoing description. It will be understood, however, that this disclosure is in many respects illustrative only. Changes may be made in details, particularly in matters of shape, size and arrangement of parts without exceeding the scope of this invention. The scope of the invention is defined in the language in which the appended claims are expressed.

What is claimed is:

1. A self-cleaning canister type filter for removal of particulate contaminants from a fluid, comprising:
   (a) a canister enclosure having an inner wall surface and having an inlet at its upper end for admitting pressurized contaminated fluid, and an outlet for discharging filtered fluid;
   (b) a filter element between said inlet and said outlet, for having a filtering surface closely spaced from said inner wall surface, for removing particulate contaminants from said fluid;
   (c) sump in the lower portion of said canister enclosure for accumulation of said particulate contaminants;
   (d) a central tubular cylinder communicating with said outlet and extending downwardly into said canister enclosure to comprise a sleeve valve cylinder having a plurality of ports therein leading from the downstream side of said filter element for passing said filtered fluid to said outlet;
   (e) a lower cylinder coaxial with and fixedly attached at its upper end to said sleeve valve cylinder;
   (f) a lower piston slideably mounted within said lower cylinder to move upwardly within said lower cylinder against a lower compression spring in response to increasing fluid pressure in said sump;
   (g) a sleeve valve piston fixedly attached to said lower piston by piston attachment means, and slideably mounted in said sleeve valve cylinder to block fluid flow through said sleeve valve ports when unpressurized, and to be motivated upwardly by said lower piston to an uppermost position to open said sleeve valve ports for fluid flow therethrough;
   (h) an upper cylinder radially spaced from said central tubular cylinder, communicating with said filter inlet and extending downwardly therefrom;
   (i) a piston guide member enclosing the upper end of said filter element, vertically spaced from said upper cylinder, and having an opening for slideable movement of said upper piston therethrough; and
   (j) an upper piston slideably mounted in said upper cylinder and piston guide member to move increasingly downward against an upper compression spring in response to increasing inlet fluid pressure, to sequentially:
      (i) compress filtered fluid within said filter element from downstream side of said filter element to loosen particulate contaminants from said filtering surface;
      (ii) initiate flow of pressurized contaminated fluid past said filtering surface of filter element to scour said surface and seep particulate contaminants into said sump; and
      (iii) permit sufficient flow of pressurized contaminated fluid into said sump to compress said lower piston upwardly against lower compression spring to expose said sleeve valve ports to allow flow of filtered fluid therethrough to pass to said outlet for discharge therefrom, and provide setting and storage of accumulated particulate contaminants within said sump.

2. The filter according to claim 1, further comprising a piston guide member enclosing the upper end of said filter element, and having a cylindrical opening for slideable passage of said upper piston therethrough.

3. The filter according to claim 1, wherein said canister enclosure comprises a closed cylinder having said inlet and said outlet in an end plate closing one end thereof.

4. The filter according to claim 1, wherein said upper cylinder is of greater diameter than said sleeve valve cylinder and is radially spaced therefrom to form an annular space, and said upper piston is an annular member slideably mounted in said annular space in sealing relationship with said upper cylinder and said sleeve valve cylinder.

5. The filter according to claim 2, further comprising a spring retention member below said upper piston, supporting said upper compression spring, and central compression spring means supporting said spring retention member.

6. The filter according to claim 5, wherein said central compression spring means comprises at least three spiral compression springs equi-spaced around said sleeve valve cylinder to support said spring retention member.

7. The filter according to claim 5, wherein the number of said central compression springs is three.

8. The filter according to claim 5, wherein the force: displacement ratio of said central compression spring means exceeds that of said upper compression spring and that of said lower compression spring.

9. The filter according to claim 5, wherein said spring retention member comprises an upwardly opening cup shaped member with a generally vertical circumferential side and a bottom with a central opening, slideably mounted annularly on the exterior of said sleeve valve cylinder, said vertical circumferential side having a vertical dimension to contact and stop further downward movement of said upper piston when said inlet valve opening is open to fluid flow.

10. The filter according to claim 5, wherein said central compression spring means has a force: displacement ratio to permit further movement of said upper piston downward through said piston guide member as motivated by an excessively high pressure of contaminated fluid, to an opening enlargement between said upper piston and piston guide member for flow of contaminted fluid to said downstream side of said filter element to relieve excessive pressure.

11. The filter according to claim 3, wherein said filter element is cylindrically shaped and coaxial with said sleeve valve cylinder and said cylindrical wall of said canister.

12. The filter according to claim 11, wherein the liquid capacity of said space between said filter element and said inner wall surface of canister enclosure is less than the displacement of said lower piston as it is compressed upwardly to fully open said sleeve valve ports to admit sufficient contaminated fluid to fully flush said filtration surface of said filter element and remove particulate contaminants to said sump.

13. The filter according to claim 1, further comprising an inner enclosure fixedly attached to said lower cylinder to retain and lower piston therein, and fixedly attached by vertical struts to said piston guide for alignment of said piston guide with said upper piston.

14. The filter according to claim 13, wherein said filter element is sealingly bonded to said inner enclosure, vertical struts and piston guide.

15. The filter according to claim 1, wherein said outlet is threaded internally for screwing onto an externally threaded pipe or tubing connector.

16. The filter according to claim 15, further comprising an elastomeric seal surrounding said filter inlet, wherein said screwing of said outlet onto said pipe or tubing connector tightens said elastomeric seal to prevent leakage of contaminated fluid from said filter.

17. The filter according to claim 1, wherein said lower compression spring is a conical helical spring having a greater overall diameter at its lower end.

18. The filter according to claim 1, further comprising elastomeric seals attached to the pressurized side of said upper piston and lower piston to prevent leakage of fluid between said pistons and said upper cylinder and lower cylinder, respectively.

19. The filter according to claim 1, further including a relief valve for permitting filtered fluid to flow to said filter outlet when said sleeve valve ports are block, said relief valve comprising:
 (a) a plurality of relief holes in the upper portion of said lower cylinder; and
 (b) an elastomeric seal membrane and a metal backing member compressed against the underside of said upper portion of lower cylinder by said lower compression spring to block and seal said relief holes except when a predetermined pressure of filtered fluid is exceeded.

20. The filter according to claim 1, wherein the lower portion of said upper piston is a substantially hollow enclosure for the upper portion of said upper compression spring.

* * * * *